Feb. 28, 1956     E. PARRE ET AL     2,736,085
METHOD OF GRAIN FLOW CONTROL
Filed Dec. 24, 1951
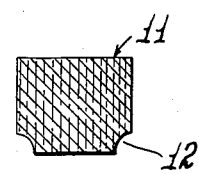
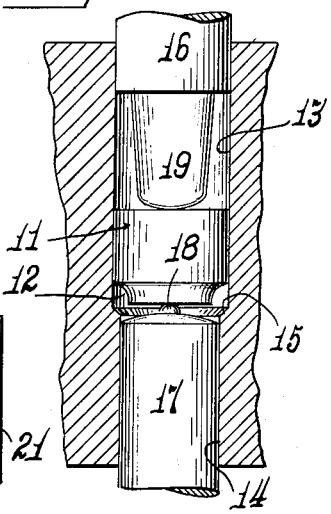
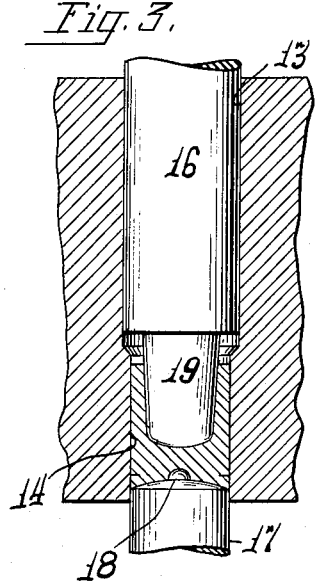
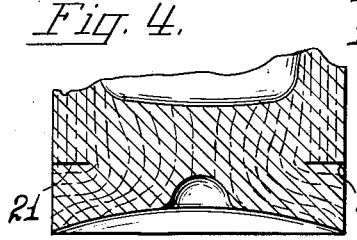
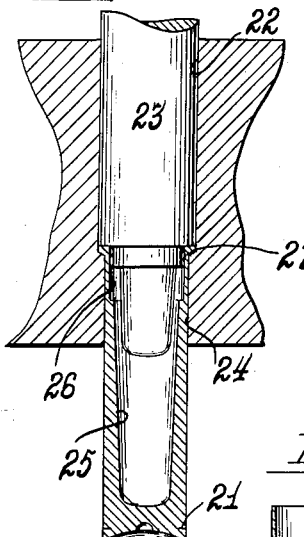
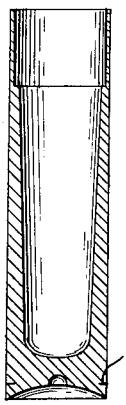
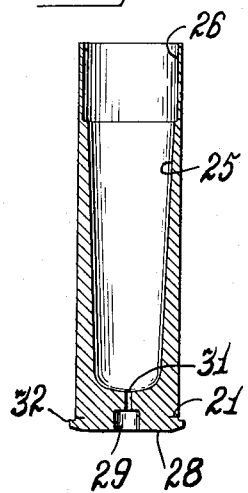
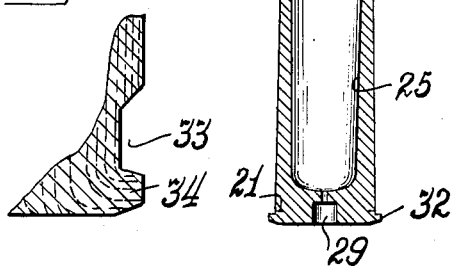
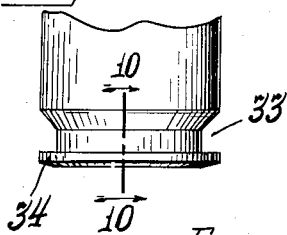
INVENTORS.
EDWIN PARRE
GORDON R. ROGERS
ATTORNEY

United States Patent Office 2,736,085
Patented Feb. 28, 1956

2,736,085

METHOD OF GRAIN FLOW CONTROL

Edwin Parre and Gordon R. Rogers, Aurora, Ill., assignors to Stoner Manufacturing Corporation, Aurora, Ill., a corporation of Illinois Application December 24, 1951, Serial No. 263,050

2 Claims. (Cl. 29—1.3)

The invention relates to the forging and shaping of cylindrical objects having a circumferential rim on an end, and more particularly to an upsetting method whereby the end of a cylindrical slug or bar blank, having its grain flow parallel to its axis, is initially shaped and then is spread so as to turn the grain flow perpendicular to the axis.

It is common practice in forging articles having a circumferential rim, to place a metal blank in a die cavity and then, by means of a plunger, to flare and subsequently head one end. In practice, this method is effective to form a circumferential rim or flange on the end of the article but, because of the fact that it is impossible by this method to turn the grain or fiber flow of the metal perpendicular to the axis so that it is radial throughout the entire body of the rim and particularly at the rim perimeter which is subjected to the greatest strain, such rim or flange cannot be subjected to any large measure of stress parallel to the axis. An example of a rim or flange which must withstand maximum stress longitudinally of its axis, and at its perimeter, without shearing or chipping, is found in the rim of a cartridge case. Obviously, there are other instances of the need for a shear resistant rim or flange on the end of bar stock, such as for example, pins, bolts and so forth, but for the purposes of disclosure, the method is described herein as utilized in the manufacture of such cartridge cases.

It is, therefore, an object of the invention to improve the structure of an article having a rim or flange on an end thereof.

Another object is to provide a novel method for controlling the grain or fiber flow of a piece of metal bar stock while shaping it into an article having a rim thereon.

Another object of the invention resides in the novel steps of the method useful in shaping metal bar stock so as to cause the grain or fiber flow at one end to be turned outwardly radially of the axis of the stock.

In accordance with the invention, the article, in this instance a steel cartridge case, is formed from a slug by a pressing or extrusion process and is subsequently milled to create the usual annular recess or channel adjacent its closed end. Cutting of the channel provides an external circumferential rim which is engaged by mechanism and subjected to longitudinal stress when the cartridge case is positioned in and withdrawn from a gun breach. The difficulties encountered in seeking to provide a rim that will withstand these stresses have been overcome by the present method of forming and it will become evident that the method disclosed and claimed can be employed to provide a shear resistant rim or flange on an end of any metal body of any object, tubular or solid.

The steps of the method are illustrated in the accompanying drawing in which:

Fig. 1 is a longitudinal central sectional view of a cylindrical metal slug, showing the direction of grain flow in broken lines.

Fig. 2 is a fragmentary sectional view of a die showing a die cavity in which the slug of Fig. 1 is positioned, and illustrating in elevation, the opposed plungers or rams used in the present method.

Fig. 3 is a view similar to Fig. 2, showing the slug and plungers in the positions assumed at the completion of the forming stroke.

Fig. 4 is an enlarged fragmentary longitudinal central sectional view of the bottom end of the slug as illustrated in Fig. 3.

Fig. 5 is a longitudinal sectional view through a die and die cavity and the partially formed cartridge casing, at the completion of the next step in the method of forming such casing.

Fig. 6 is an enlarged longitudinal central sectional view of the partially formed cartridge casing illustrated in Fig. 5 but showing the flange on the open upper end thereof sheared off.

Fig. 7 is a view similar to Fig. 6, but showing the partially formed cartridge casing as it appears following the performance thereon on two successive steps of the method.

Fig. 8 is a view similar to Fig. 7, showing the casing in its substantially completed form.

Fig. 9 is a fragmentary elevational view of the lower or closed end of the cartridge casing upon completion of the steps of method employed in its construction.

Fig. 10 is a fragmentary sectional view, on an enlarged scale, taken on line 10—10 of Fig. 9 and illustrating, in broken lines, the flow of the grain.

Referring now to the accompanying drawing in detail, which drawing discloses the various steps of the method as practiced in the manufacture of a cartridge case, there is illustrated in Fig. 1, a longitudinal section of a cylindrical slug 11. This slug may constitute a piece cut from steel bar stock but in any event the grain thereof is substantially parallel to its axis as indicated by broken lines of the said drawing. One end of the slug has its diameter reduced, as at 12, by any suitable means or method which will not disturb the natural grain flow. Preferably, the diameter is reduced by turning the slug on a lathe or the like and the reduced diameter has a contour corresponding substantially to that illustrated.

After the slug has been shaped, as illustrated in Fig. 1, it is placed in a die cavity 13 (Fig. 2). Although the present method contemplates the performance of subsequent steps while the slug is cold, that is, at normal room temperatures, it may be heated to a temperature above normal to facilitate further processing. The cavity 13 has a passage 14 of reduced diameter opening out of its bottom to thereby provide an internal shoulder 15. A pair of opposed plungers or rams 16 and 17 operate, respectively, in the die cavity 13 and passage 14. The positions of the plungers at the start of the operation for performing the next step in the shaping of the cartridge case is as illustrated in Fig. 2, and their positions at the completion of their strokes is shown in Fig. 3.

Specifically, the first step of the method is accomplished substantially as follows: Pressure is applied on both plungers or rams 16 or 17 so that initially a nib projection 18 on the upper end of the plunger 17 acts to detent the bottom face of the slug 11. Continued application of pressure causes the nose portion 19 of the plunger 16 to urge the slug downwardly against the plunger 17 and into the passage 14. This application of pressure causes the lower end portion, that is the portion of reduced diameter, of the slug 11 to conform to the contour of the contacted end of plunger 17 and to fold outwardly radially into a position substantially as shown in Figs. 3 and 4. At the same time the metal of the remaining portion of the slug 11 is extruded upwardly in passage 14 and around the nose portion 19 of plunger 16.

Upon referring specifically to Fig. 4, it is important to note that the initial denting, concaving and subsequent outward folding of the material at the lower or reduced end of the slug 11 causes the metal in that area to turn outwardly radially and subsequently close or absorb the gap initially present because of the reduced diameter 12. In doing this, the metal is carried outwardly radially to such a degree that the grain flow in the turned portion is directed substantially radial i. e. substantially parallel to the bottom face of the partially formed slug 11. The closing of the gap provided by the reduced diameter 12 leaves a clearly defined circumferential crack 21 adjacent the lower partially formed end of the slug 11. This crack is ultimately eliminated entirely from the finished product but its presence at this time is unavoidable owing to the sharp turning of the metal at the lower end of the slug during the initial steps of the operations thereon.

After the slug has been partially formed in a manner shown in Figs. 3 and 4 it is placed in a die cavity 22 (Fig. 5) and acted upon by a reciprocal plunger 23 which causes the slug to be extruded downwardly through a passage 24 communicating with the bottom of the cavity 22. At this stage of the operation, the metal is extruded substantially the entire distance required for the formation of the cartridge case and its previously formed bottom is not disturbed by this operation which is performed solely to draw out the cartridge casing and provide the required internal cavity 25 which is shouldered at 26. It might be observed that all of the metal of the partially formed slug is not extruded through the passageway 24 during this step of the operation. As a matter of fact, a quantity thereof remains in the die cavity 22 and forms an external flange 27 on the open end of the partially formed cartridge case.

The next step in the method of forming the cartridge case disclosed herein for purposes of illustration only is to shear the external flange 27 from the upper open end of the cartridge case to provide a product which somewhat resembles that illustrated in Fig. 6.

The semifinished article illustrated in Fig. 6 is next placed in a suitable machine and the concave bottom is flattened, as at 28 (Fig. 7) and at the same time the detent in said bottom is shaped to define a primer well 29. A firing hole 31 then is pierced in the closed bottom of the cartridge case, as is also illustrated in Fig. 7. It might be noted at this time that when the bottom of the cartridge case is flattened excess metal flows outwardly radially to define a flange 32 surrounding the bottom.

Following the flattening of the bottom of the cartridge case and the primer well shaping and piercing operations, the upper open end of the cartridge case is rolled inwardly by suitable apparatus into the finished configuration shown in Fig. 8. The cartridge case when so formed is then placed in a lathe or other machine and the outside surface of the cartridge case at the bottom and on both sides of the crack 21 is turned or milled out to provide an annular channel or groove 33 spaced above the bottom of the cartridge case. Formation of this groove removes the crack 21 from the finished product and also removes the excess material flange 32 (shown in Fig. 7) so that the rim 34 coincident with the bottom face of the cartridge case has a diameter corresponding substantially to the diameter of the cartridge case immediately above the groove 33.

The formation of the groove 33 serves to define the flange 34 which constitutes the novel stress resistant flange provided on a cylindrical body by the present method. Upon referring to Fig. 4, it will be observed that substantially all of the grain flow in the flange 34 extends radially outwardly to the perimeter thereof and that only a small portion of said grain flow is diverted downwardly angularly towards the bottom face of the cartridge case. When the bottom of the casing is flattened, as in Fig. 7, the small portion of angularly disposed grain flow is displaced substantially perpendicular to the axis. Consequently, all of the grain flow in the finished rim 34 is radial. As a consequence, the rim or flange 34 is substantially shear proof because there is no angularly disposed grain in the major portion thereof as has been the case when prior methods and processes of flange or rim formation have been employed.

It should be understood that although the steps of the method for forming a shear resistant rim or flange on a body, either solid or tubular, has been specifically described herein with reference to the forming of a cartridge case, the invention is not to be limited to the specific disclosure and the description thereof but that, the invention is to embrace any method or process embodying the specific characteristics inherent in the present invention which specifically includes the initial indenting and concaving of the slug and the subsequent folding outwardly radially of the material at the bottom of the slug or other piece of metal stock from which the article is to be formed so as to cause the normally longitudinally extending grain flow in the slug to be turned perpendicular to its axis throughout the entire body of the shear resistant rim or flange.

What we claim and desire to secure by Letters Patent of the United States is:

1. In the process of making a shaped metal body with an external circumferential shear-proof rim at one end which comprises forming a slug having its grain flow parallel to its axis with a reduced outside dimension at one end, pressing it in a die cavity to fold the material in the area of the reduced dimension outwardly so as to fill the void initially present in the die cavity because of the reduced dimension with the metal having its grain flow perpendicular to the slug axis.

2. The process of manufacturing a cylindrical body from a slug of metal stock which comprises forming a reduced diameter at one end of said slug, heating the slug to a suitable temperature, placing the slug in a circular die cavity with its grain flow parallel to the cavity axis and its reduced diameter at the end disposed in the bottom of the cavity, applying pressure downwardly on said slug to initially dent the reduced diameter slug end and to then roll the material in the region of the reduced diameter outwardly radially so as to dispose the grain flow in said region perpendicular to the slug axis, extruding at least the major portion of the slug to define a cylindrical body closed at its lower end, and thereafter shaping the extruded body to provide an external circumferential rim at its closed end, having all of its grain flow extending radially.

References Cited in the file of this patent

UNITED STATES PATENTS

| | | |
|---|---|---|
| 191,430 | Hotchkiss | May 29, 1877 |
| 1,296,842 | Offutt et al. | Mar. 11, 1919 |
| 2,140,775 | Talbot-Crosbie et al. | Dec. 20, 1938 |
| 2,338,652 | Lefere | Jan. 4, 1944 |
| 2,349,970 | Lambeek | May 30, 1944 |
| 2,371,716 | Snell | Mar. 20, 1945 |

FOREIGN PATENTS

| | | |
|---|---|---|
| 23,304 | Great Britain | 1908 |
| 700,207 | Germany | Dec. 16, 1940 |
| 719,783 | Germany | Apr. 16, 1942 |